United States Patent
Kalaboukis (10) Patent No.: US 8,504,545 B2
(45) Date of Patent: *Aug. 6, 2013

(54) APPARATUS AND METHODS FOR MANAGING A SOCIAL MEDIA UNIVERSE

(75) Inventor: Chris T. Kalaboukis, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/448,248

(22) Filed: Apr. 16, 2012

(65) Prior Publication Data

US 2012/0203839 A1 Aug. 9, 2012

Related U.S. Application Data

(63) Continuation of application No. 12/512,397, filed on Jul. 30, 2009, now Pat. No. 8,180,752.

(51) Int. Cl.
*G06F 7/00* (2006.01)
*G06F 17/30* (2006.01)

(52) U.S. Cl.
USPC ............................ 707/705; 707/722; 707/922

(58) Field of Classification Search
USPC ................. 707/705, 709, 710, 722, 724, 732, 707/736, 747, 758, 913, 922
See application file for complete search history.

(56) References Cited

U.S. PATENT DOCUMENTS

| | | | |
|---|---|---|---|
| 5,745,889 A | 4/1998 | Burrows | |
| 6,021,409 A | 2/2000 | Burrows | |
| 7,844,820 B2 | 11/2010 | Martinez | |
| 7,890,485 B2 * | 2/2011 | Malandain et al. | 707/705 |
| 7,895,049 B2 | 2/2011 | O'Sullivan et al. | |
| 8,015,019 B1 | 9/2011 | Smith et al. | |
| 8,160,532 B2 | 4/2012 | Vishwanathan et al. | |
| 8,180,752 B2 | 5/2012 | Kalaboukis | |
| 2007/0083380 A1 | 4/2007 | Martinez | |
| 2007/0083537 A1 | 4/2007 | Martinez | |
| 2008/0091771 A1 | 4/2008 | Allen et al. | |
| 2008/0215607 A1 | 9/2008 | Kaushansky et al. | |
| 2009/0119173 A1 | 5/2009 | Parsons et al. | |
| 2009/0157845 A1 * | 6/2009 | Kim et al. | 709/218 |
| 2009/0307345 A1 | 12/2009 | Carter et al. | |
| 2010/0125562 A1 * | 5/2010 | Nair et al. | 707/709 |
| 2011/0010431 A1 | 1/2011 | Rooks et al. | |

OTHER PUBLICATIONS

US Office Action mailed Jul. 22, 2011, issued in U.S. Appl. No. 12/512,397.
US Notice of Allowance and Fees due mailed Jan. 12, 2012, issued in U.S. Appl. No. 12/512,397.

* cited by examiner

*Primary Examiner* — Tony Mahmoudi
*Assistant Examiner* — Merilyn Nguyen
(74) *Attorney, Agent, or Firm* — Weaver Austin Villeneuve & Sampson LLP (57) ABSTRACT

Methods and apparatus include features for managing social media universes. In one embodiment, media content and community members that have been associated with a new concept for creating a new universe are searched on a plurality of media content servers. For each found new concept, an association is retained between the new universe for the new concept and any found media content and community members. When a requesting user requests to view the new universe, a representation of the media content and the community members that are associated with the new universe is displayed for the requesting user.

21 Claims, 8 Drawing Sheets

APPARATUS AND METHODS FOR MANAGING A SOCIAL MEDIA UNIVERSE

CROSS-REFERENCE TO RELATED APPLICATION DATA

The present application is a continuation of and claims priority under 35 U.S.C. 120 to U.S. patent application Ser. No. 12/512,397, titled APPARATUS AND METHODS FOR MANAGING A SOCIAL MEDIA UNIVERSE, filed on 30 Jul. 2009, now U.S. Pat. No. 8,180,752, the entire disclosure of which is incorporated herein by reference for all purposes.

BACKGROUND OF THE INVENTION

The present invention is related to techniques and mechanisms for managing media objects in a social context.

Users of the Internet have access to a wide variety of applications that allow them to collaborate or communicate with each other regarding specific topics of interests. For example, users of Yahoo! Answers can collaborate around a specific question (e.g., how to troubleshoot a particular electronic device). In another example, users of Yahoo! Finance can collaborate with respect to various financial topics.

Although specific applications can provide users with specific venues for discussing various topics, there continues to be a need for improved mechanisms for building social communities around a specific area of interest.

SUMMARY OF THE INVENTION

In certain embodiments, mechanisms for managing social media universes are disclosed. In one embodiment, media content and community members that have been associated with a new concept for creating a new universe are searched on a plurality of media content servers. For each found new concept, an association is retained between the new universe for the new concept and any found media content and community members. When a requesting user requests to view the new universe, a representation of the media content and the community members that are associated with the new universe is displayed for the requesting user.

In a specific implementation, new media content and community members that have also been associated with the new concept are periodically searched for, and an association between the new universe and any found new media content and community members is retained. In a further aspect, periodically searching for new media content includes searching for new image objects, new video objects, and new text objects that pertain to the new concept. In another aspect, searching for media content and community members that have been associated with a new concept is accomplished by a web crawling process. In yet another embodiment, a new concept pertains to one or more of the following: a particular person, a particular thing, a particular event, or a particular place. In one embodiment, the representation of the media content and the community members indicates a level of how much media content has been contributed and/or how many members have contributed media content for such new universe. In yet another embodiment, the representation of the media content and the community members allows the requesting user to view all of the media content and community members of the new universe.

In another embodiment, the invention pertains to an apparatus having at least a processor and a memory. The processor and/or memory are configured to perform one or more of the above described operations. In another embodiment, the invention pertains to at least one computer readable storage medium having computer program instructions stored thereon that are arranged to perform one or more of the above described operations.

These and other features of the present invention will be presented in more detail in the following specification of certain embodiments of the invention and the accompanying figures which illustrate by way of example the principles of the invention.

DETAILED DESCRIPTION OF THE SPECIFIC EMBODIMENTS

Reference will now be made in detail to specific embodiments of the invention. Examples of these embodiments are illustrated in the accompanying drawings. While the invention will be described in conjunction with these specific embodiments, it will be understood that they are not intended to limit the invention to one embodiment. On the contrary, they are intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Certain embodiments of the present invention provide mechanisms for creating and managing a community around a specific area of interest. Initially, a user (or automated process) may identify a new topic or concept of interest, as well as one or more associated media objects, around which such user wishes to form a "social universe." For example, a user may identify "President Obama" as a new concept of interest with respect to a blog entry. Users may become community members of the social universe for such new concept by contributing media content to such area of interest using a diverse or heterogeneous mix of media content servers and applications. For example, users may identify the same concept "President Obama" with respect to photographs, social network textual or graphic entries, etc. The media content contributions for a particular concept automatically become part of the social universe for such concept, which is then retained and accessible by interested users. Interested users can view particular universes and browse/search for particular universes and their associated media content and community members.

An object or concept of interest may take any suitable form, such as a person (including a representation of a person and/or any information related to a particular person), a place (including a representation of a place and/or geographical tag information), a thing (e.g., an inanimate object which does not have a representation as a person or a place, an object which has an analog in the real world, a virtual object), an event (representing a specific time, place, person, and/or group), etc. A media object may take any suitable form that can relate to the new concept of interest. A media object can generally be stored as information that can be retrieved and experienced by a person. For example, a media object may take the form of an image object (e.g., photograph, advertisement), a video object (e.g., documentary, television show, movie, video clip, advertisement, etc.), a URL (Universal Resource Locator) link, a text object (e.g., article, blog entry, book, book excerpt, quote, email or instant message, social networking update, etc.), etc. Media objects may pertain to any thing, such as a person, group of people, thing (e.g., photo of a book), inanimate or virtual object, event, etc., for example, as listed above with respect to example concepts of interest.

Figure 1:
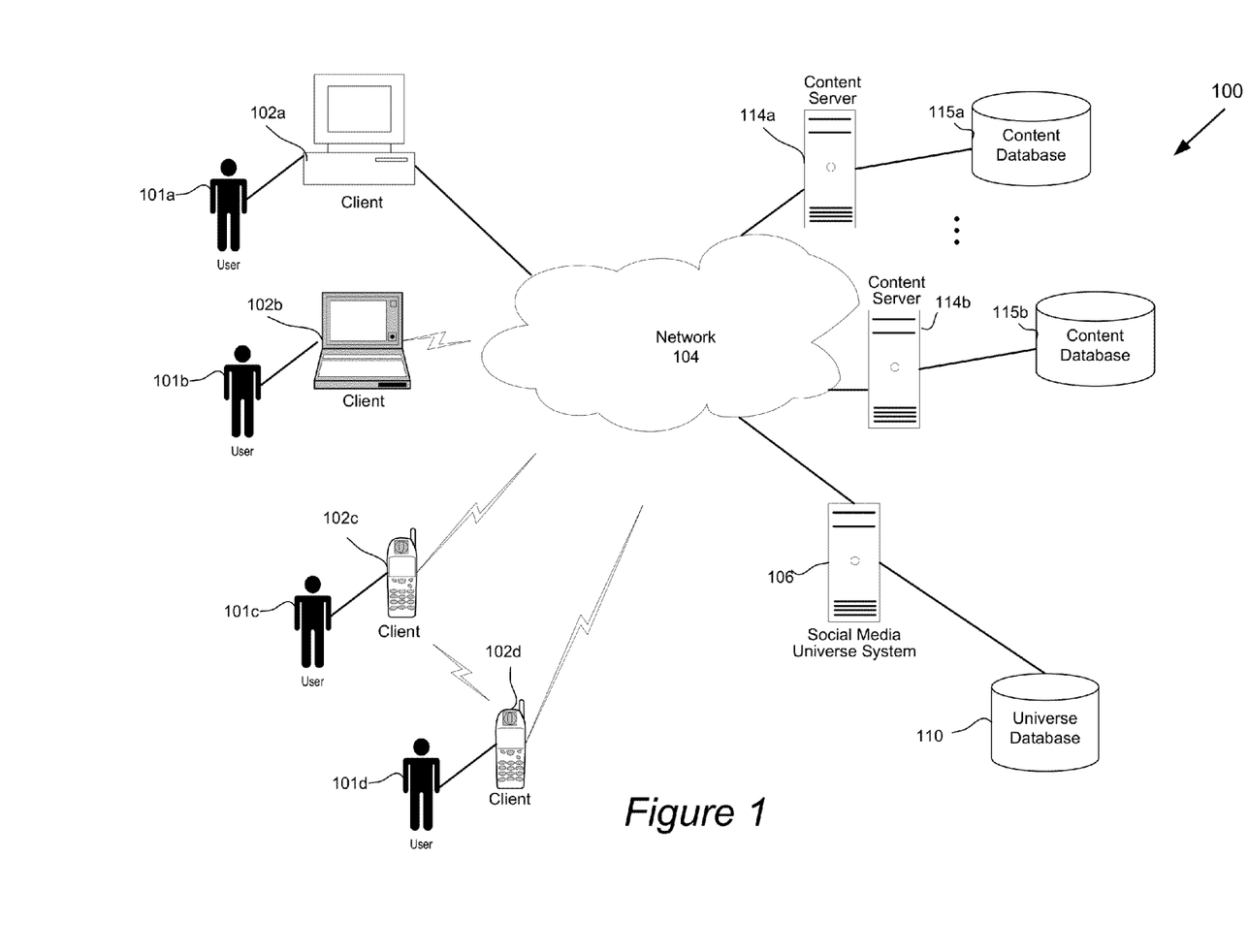
FIG. 1 illustrates an example network segment in which the present invention may be implemented in accordance with one embodiment of the present invention.

Prior to describing detailed mechanisms for managing social media universes, a computer network architecture will first be briefly described to provide an example context for practicing techniques of the present invention. FIG. 1 illustrates an example network segment 100 in which the present invention may be implemented in accordance with one embodiment of the present invention. As shown, a plurality of clients 102a~d may access various content servers, for example, content servers 114a or 114b or social media universe server 106 via network 104. Media content applications may be implemented on any number of servers although only two content servers 114a and 114b are illustrated for clarity and simplification of the description. Each server (e.g., 114a, 114b, 106) may have access to one or more database(s) (e.g., 115a, 115b, or 110) into which media content or universe information is retained.

The network may take any suitable form, such as a wide area network or Internet and/or one or more local area networks (LAN's). The network 104 may include any suitable number and type of devices, e.g., routers and switches, for forwarding requests from each client to a particular server application, forwarding application results back to the requesting clients, or forwarding data between various servers.

Embodiments of the present invention may also be practiced in a wide variety of network environments (represented by network 104) including, for example, TCP/IP-based networks (e.g., Rate Control Protocol or RCP, Transport Control Protocol or TCP, Fast TCP, Stream-based TCP/IP or STCP, eXplicit Control Protocol or XCP, etc.), telecommunications networks, wireless networks, mobile networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be affected or employed at different locations.

A content server may take any suitable form for storing or accessing any suitable media content. In one implementation, a content server implements a communication application, such as email, instant messaging, social networking, blogging, IP telephony, etc. A communication application generally allows a user (human or automated entity) to communicate with one or more other users via a communication device (e.g., telephones, persona digital assistants or PDA's, computers, etc.) via one or more networks (e.g., 104) and retain user communication information, for example, in database 115a. Embodiments of the present invention may be employed with respect to communication data obtained from communication server applications or generated from any communication application, such as general communications applications that include Yahoo! Email, Yahoo! IM, Facebook chat, etc.

In another example implementation, a content server may implement a mechanism for retaining content information, e.g., in database 115b, regarding various specific types of media objects. By way of example, the content server may implement a photograph or video organization application.

Embodiments of the present invention may include social media universe server 106 for creating and managing dynamic social universes. The social media universe system may be implemented within another application server, such as a content server 114a or 114b or on a separate server, such as the illustrated social media universe system 106. In general, the social media universe system is configured to allow the creation and management of dynamic social universes based on identified concepts of interest and related media objects. The social media universe system 106 may access one or more universe databases, e.g., database 110, for storing representational information regarding universe concepts, universe media content, universe community members, etc.

Figure 2A:
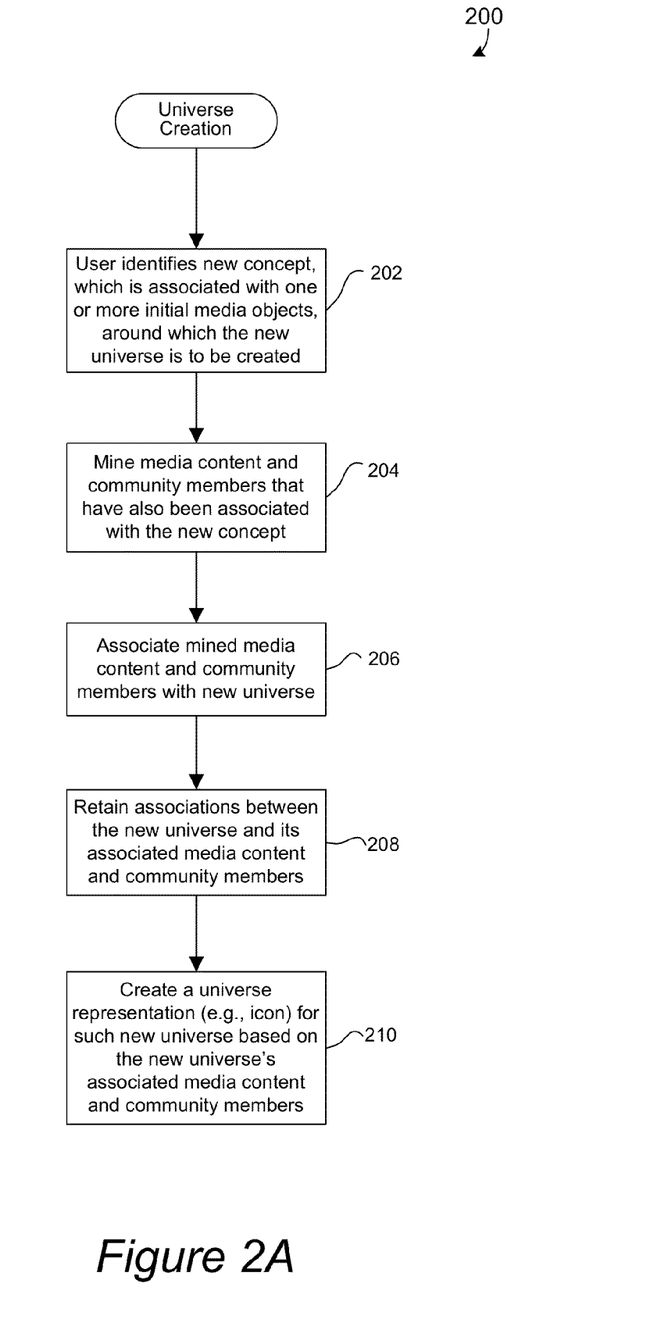
FIG. 2A is a flow chart illustrating a procedure for creating a universe in accordance with one embodiment of the present invention.

Mechanisms for creating and managing social universes for media objects across diverse content servers can be implemented in any suitable manner. FIG. 2A is a flow chart illustrating a procedure 200 for creating a universe in accordance with one embodiment of the present invention. Initially, a user may identify a new concept, which is associated with one or more initial media objects, around which a new universe is to be created in operation 202.

Figure 2B:
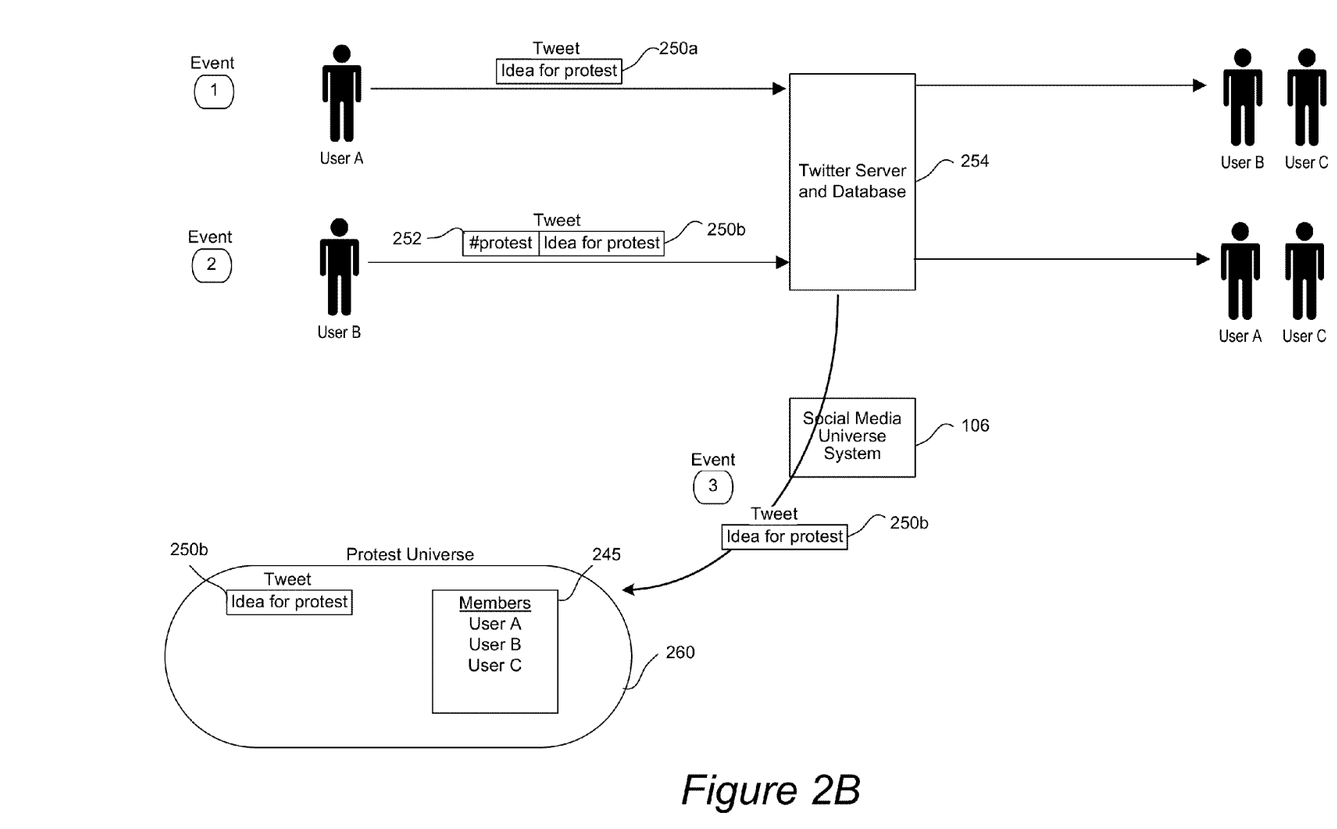
FIG. 2B is a diagrammatic illustration of a process for creating an example universe for a protest concept in accordance with a specific implementation of the present invention.

FIG. 2B is a diagrammatic illustration of a process for creating an example universe 260 for a protest concept in accordance with a specific implementation of the present invention. In a first event, user A sends a tweet 250a that pertains to an idea for a protest to a twitter server and database 254. In this example, user B and user C receive the tweet 250a. In a second event, user B defines a new concept with respect to the idea for this protest, which is contained in protest tweet 250b. In this implementation, the new concept is identified by appending a hash tag 252 to the tweet 250b, which corresponds to the idea for a protest. As shown, the hash tag 252 takes the form "#protest", which is appended to tweet 250b, which is sent to twitter server and database 254. In this example, users A and C also receive this tagged tweet.

Any suitable mechanism may be used to identify a concept, such as a hash tag. For example, a concept for a social media universe may be indicated by a single hash tag that the universe creator (who is a user who initiates creation of a universe) generates when he or she delivers the first media object which contains the concept. In a specific example, someone may want to start the social media universe "Protesting Oil Companies". This universe creator could post a media object and add a concept hash tag to that object. This person may have heard about a spill in Alaska and send out a tweet "Did you hear about the Alaska spill? Going to start an #oilprotest". That tweet initiates the "oilprotest" social media universe concept. As that user and others wish to augment that social media universe, they begin to tag media objects that they create with the same hash tag of #oilprotest. For instance, another user in Alaska may take a photo of the spill, upload it to Flickr and tag it "#oilprotest". When more and more users create media and add such #oilprotest tag at a plurality of sites all over the Internet, the "oil protest" universe grows. Although single word hash tags are shown, it may be feasible to use multiple word hash tags, such as "Protesting Oil Companies" or #[protesting oil companies]. Other example tags that may be used for identifying concepts with respect to a particular media object and universe may include the "triple tag", free form tags, etc.

A modifier may also be added to the tag to indicate a positive or negative aspect related to such concept. For example, a "+#Obama" could indicate a concept related to positive aspects of President Obama, while a "-#Obama" could indicate a concept related to negative aspects of President Obama. In another example, a numeric value may also be added to indicate a level of positivity or negativity. For example, a "+9#Obama" tag could relate to more positive concepts about Obama than a "+3#Obama" tag.

Referring back to FIG. 2A, media content and community members that have also been associated with the new concept may then be mined in operation 204. The mined media content and community members may then be associated with the new universe in operation 206. The associations between the new universe and its associated media content and community members may then be retained in operation 208.

In a third event illustrated in FIG. 2B, social media universe system 106 recognizes that a new concept for a protest has been identified by the hash tag 252. Accordingly, the identified tweet 250b is associated with a protest universe 260. Additionally, the users who send or receive the initially identified tweet 250b may also be added to the protest universe 260. As shown, users A, B and C are added in a members list 245 associated with protest universe 260.

In most cases, the initial universe creator would be the only member of the universe. For example, an initial user may be the first person to associate a hash tag for "Michelle Obama" with a photograph, video, or article. In this example, the "Michelle Obama" universe would initially include the user who initially created the hash tag for such universe, as well as the tagged media object. In contrast, as in the illustrated twitter example, multiple users may initially be associated with a new universe. By way of another example, an email message may be associated with a new identified concept, e.g., tagged with a "protest" hash. The email sender and one or more receivers could then form part of the new "protest" universe's community.

The social media universe system can become aware of new concepts for universes, which are identified with respect to any accessible number and type of server, application, and its associated databases, in any suitable manner. In a specific implementation, each application for creating and managing media objects can be configured to push universe information that is associated with each media object to a social media universe server. For example, a photograph application server can be configured to send photograph and user information to a social media server when such photograph is identified by a user with a new concept for a universe. Likewise, each content server and application server can be configured to send universe information to the social media universe server when universes are created and new content is associated with such universes.

In an alternative embodiment, the social media universe server may be configured to perform web crawling techniques so as to locate media objects which have been identified with a new concept for a universe. Any web crawling techniques may be used. Typically, these crawlers or spiders collect information from various web pages from multiple web servers/databases. Exemplary methods for crawling or collecting information over a network or internet are described in commonly owned U.S. Pat. No. 6,021,409, entitled "METHOD FOR PARSING, INDEXING AND SEARCHING WORLD-WIDE WEB PAGES," the disclosure of which is herein incorporated by reference in its entirety. In one embodiment, a crawling program crawls through media content located on a network such as the Internet, collecting and examining web pages for relevant media item portions.

In a further embodiment, an index component (not depicted) which may or may not be a part of the media crawling program parses and indexes media item portions and associated information collecting or examined by the web crawling process. In one embodiment, the index component generates an index that defines a structure for the media item portions and related information that allows for location and retrieval of the media item portions and related information. According to one embodiment, the index component creates an index of word-location pairs that allows a search engine to determine specific media item portions and information regarding the same in response to a query, which may be from a user, software component, automated process, etc. However, the indexing may be modified to take the form of a concept or universe index. Exemplary methods for indexing information, using a word index that can be altered to form a universe index, are described in commonly owned U.S. Pat. No. 5,745,889, entitled "METHOD FOR PARSING INFORMATION OF DATABASE RECORDS USING WORD-LOCATION PAIRS AND METAWORD-LOCATION PAIRS," the disclosure of which is herein incorporated by reference in its entirety. In one embodiment, universe index information is written to an index data store or database for storage, e.g., is universe database 110.

A universe representation may also be created for such new universe based on the new universes' associated media content and community members in operation 210. A universe representation may take any suitable form that allows a user to quickly view information regarding a universe. For example, an icon or graphic that corresponds to the universe's level of completeness (e.g., empty vs. full of content) may be formed and retained as described further below. That is, the icon or representation for a universe may indicate a level of how much media content has been contributed and/or how many members have contributed media content to such universe. The icon can be analogous to a fuel gauge that shows a level of completeness or contribution frequency. The gauge may have different colors for increasing levels of completeness (e.g., red, yellow, green). The icon could also or alternatively indicate the types of content that have been added to the particular universe. For example, the icon could be in the form of a pie chart that illustrates the percentages of video, text, social network, or photographic content. In sum, the icon could represent any information about the universe's content or membership. By way of examples, the icon can represent the number of articles, the number photographs, the number of contributing members, etc. This representational icon could serve as a brief glimpse into what a particular universe contains. A user could then decide whether to delve into the universes particular media content based on the icon. That is, after viewing an icon for a particular universe, a user could then view the detailed media content and/or membership information for such particular universe.

Figure 3A:
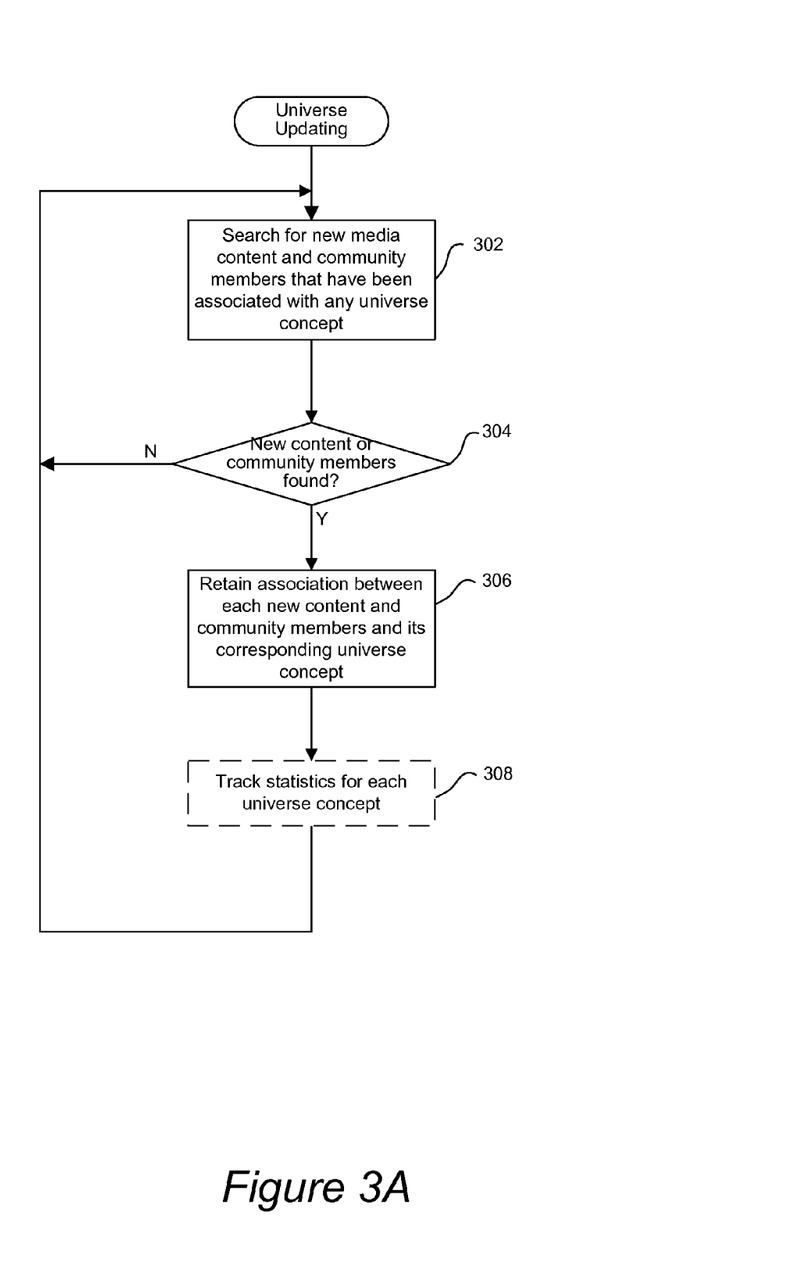
FIG. 3A is a flowchart illustrating a procedure for updating an existing universe in accordance with a specific implementation of the present invention.

FIG. 3A is a flowchart illustrating a procedure 300 for updating an existing universe in accordance with a specific implementation of the present invention. Initially, new media content and community members that have been associated with any universe concept may be searched (e.g., by a web crawling process) in operation 302. It may then be determined whether new content or community members have been found in operation 304. If new content or community members are found, an association between each new content and community member and its corresponding universe concept may be retained (e.g., universe indexes for various media content, as well as community information, are stored in universe database 110) in operation 306. Statistics may also be tracked for each universe concept (and retained) in operation 308. The procedure then can repeat so that new media content and community members are located.

Figure 3B:
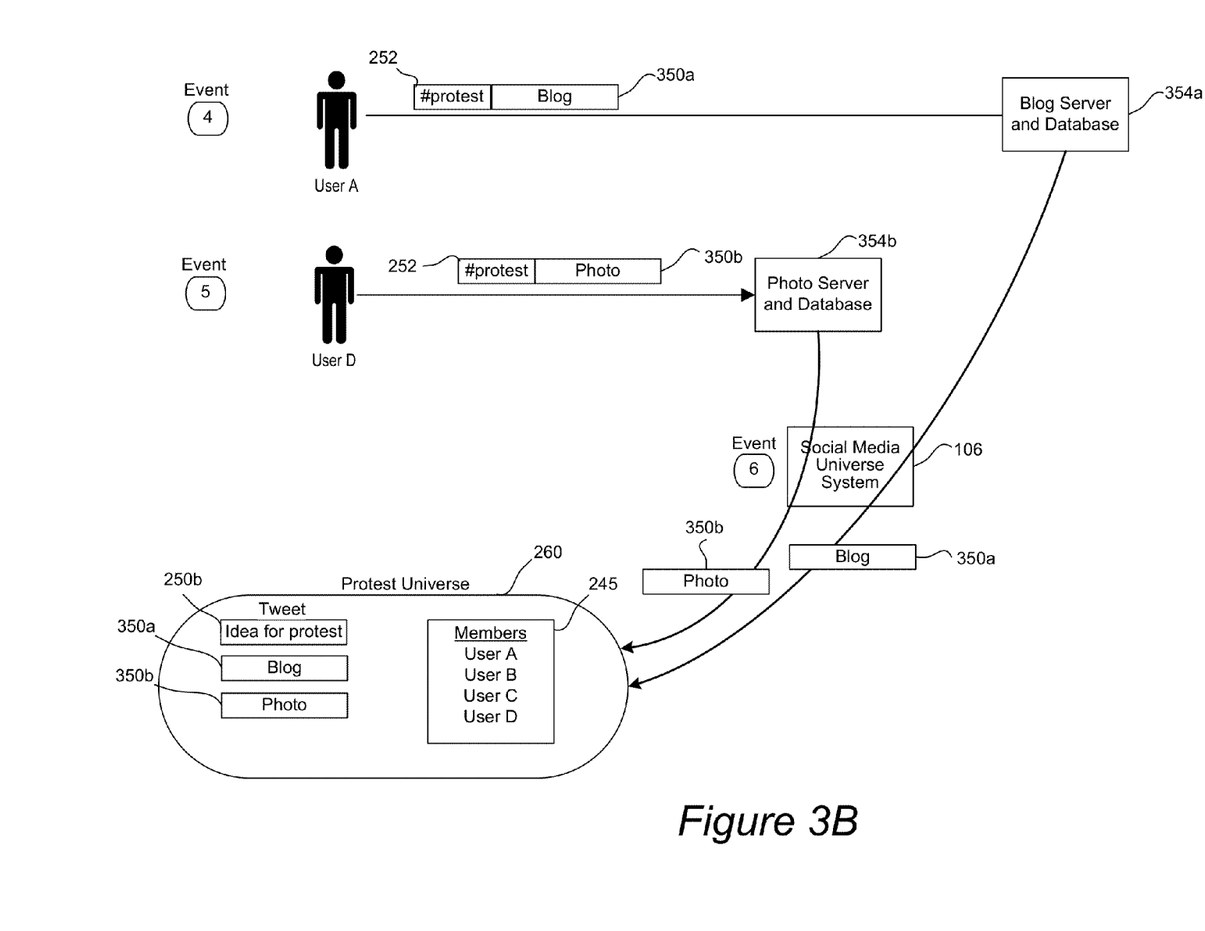
FIG. 3B is a diagrammatic representation of a process for updating an example universe pertaining to a protest concept in accordance with one embodiment of the present invention.

FIG. 3B is a diagrammatic representation of a process for updating an example universe pertaining to a protest concept in accordance with one embodiment of the present invention. FIG. 3B includes events that happen after the events for creating the protest universe 260 as shown in FIG. 3A. During a fourth event as shown in FIG. 3B, user A creates a blog 350a that is associated with the protest concept via the "protest" hash tag 252. The blog 350a and its hash tag for the protest concept can be sent, for example, to a blog server and database 354a. Similarly, during a fifth event, user D sends a photograph 350b that is identified with the same "protest" hash tag 252. In this example, a photo server and database 354b receives the photograph 350b and its associated hash tag 252 for the protest concept.

The social media universe system 106 can be configured to locate media objects or content, as well as community members, which are associated with the protest concept. Accordingly, during event 6 social media universe system 106 locates the tagged media objects, which include blog object 350a and photograph 350a, for "protest" concept and adds such located media objects to the protest universe 260. Additionally, user D is added to the members list 245 of protest universe 260. Associations between each media object and its particular contributing members may also be retained. For example, photo 350b is associated with user D, and blog 350b is associated with user A.

Certain embodiments of the present invention provide a way for users to create universes for new concepts on the fly around media objects, irrespective of the application that is being used to create the associated media objects. Communities can be created on the fly around any object, and the creation, membership and vitality of those communities can be automatically generated and maintained by anyone touching that object. Thus, all internet objects can be enlivened with social and community features.

Figure 4:
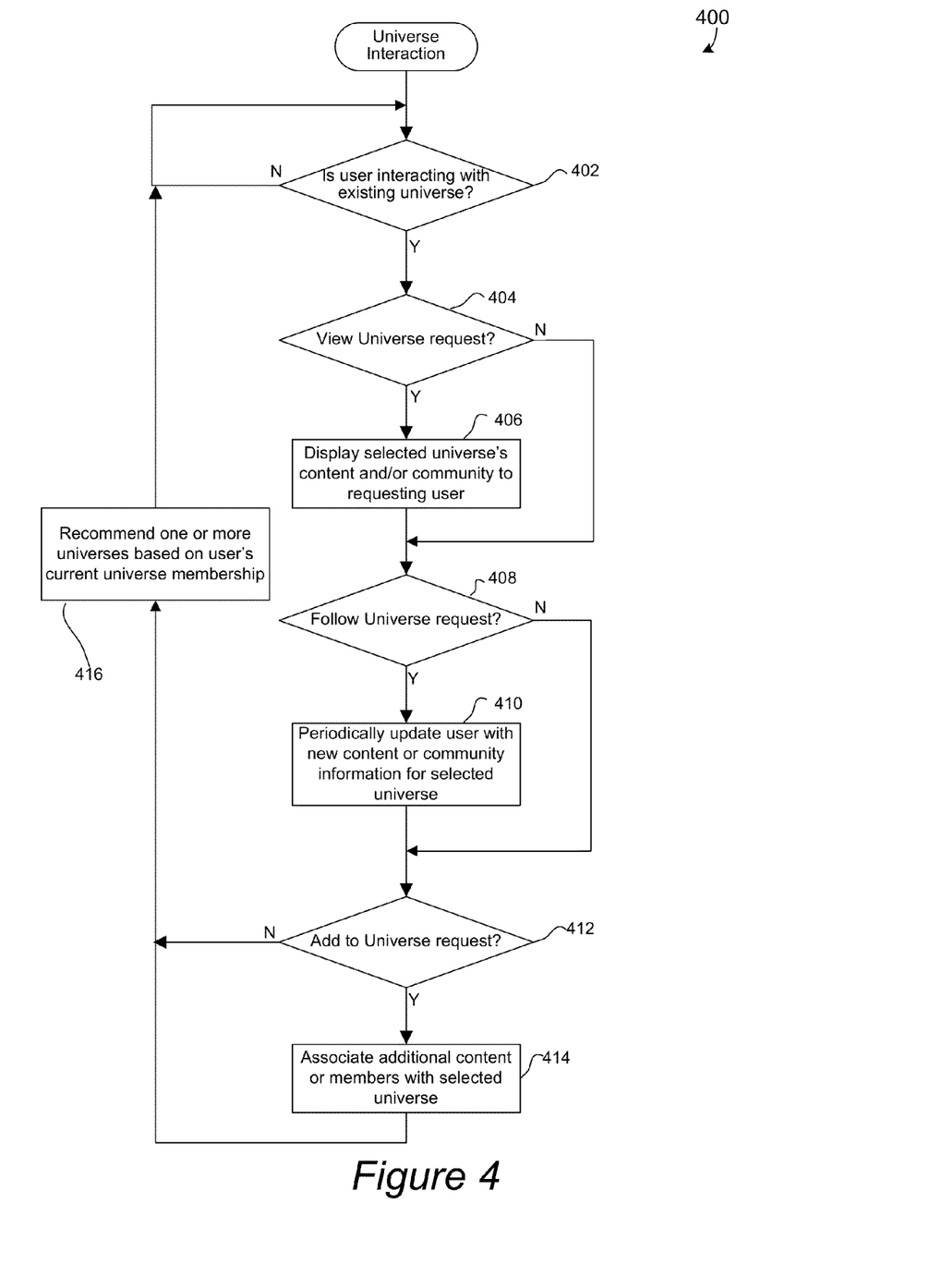
FIG. 4 is a flow chart illustrating a procedure for interacting with existing universes in accordance with a specific implementation of the present invention.

Once universes are created and updated with media content and community aspects, users can interact with particular universes, for example, via the social media universe server. FIG. 4 is a flow chart illustrating a procedure 400 for interacting with existing universes in accordance with a specific implementation of the present invention. As an initial step, it may first be determined whether a user is interacting with an existing universe in operation 402. For example, a user may select and interact with particular universes via a user interface.

When a user begins to interact with an existing universe, it may then be what type of interaction is being initiated by the user. For example, it may also be determined whether a "view universe" request has been received in operation 404. If such a request has been received, at least a portion of the selected universe's content and/or community may be displayed to the requesting user in operation 406. Otherwise, this operation may be skipped.

Figure 5:
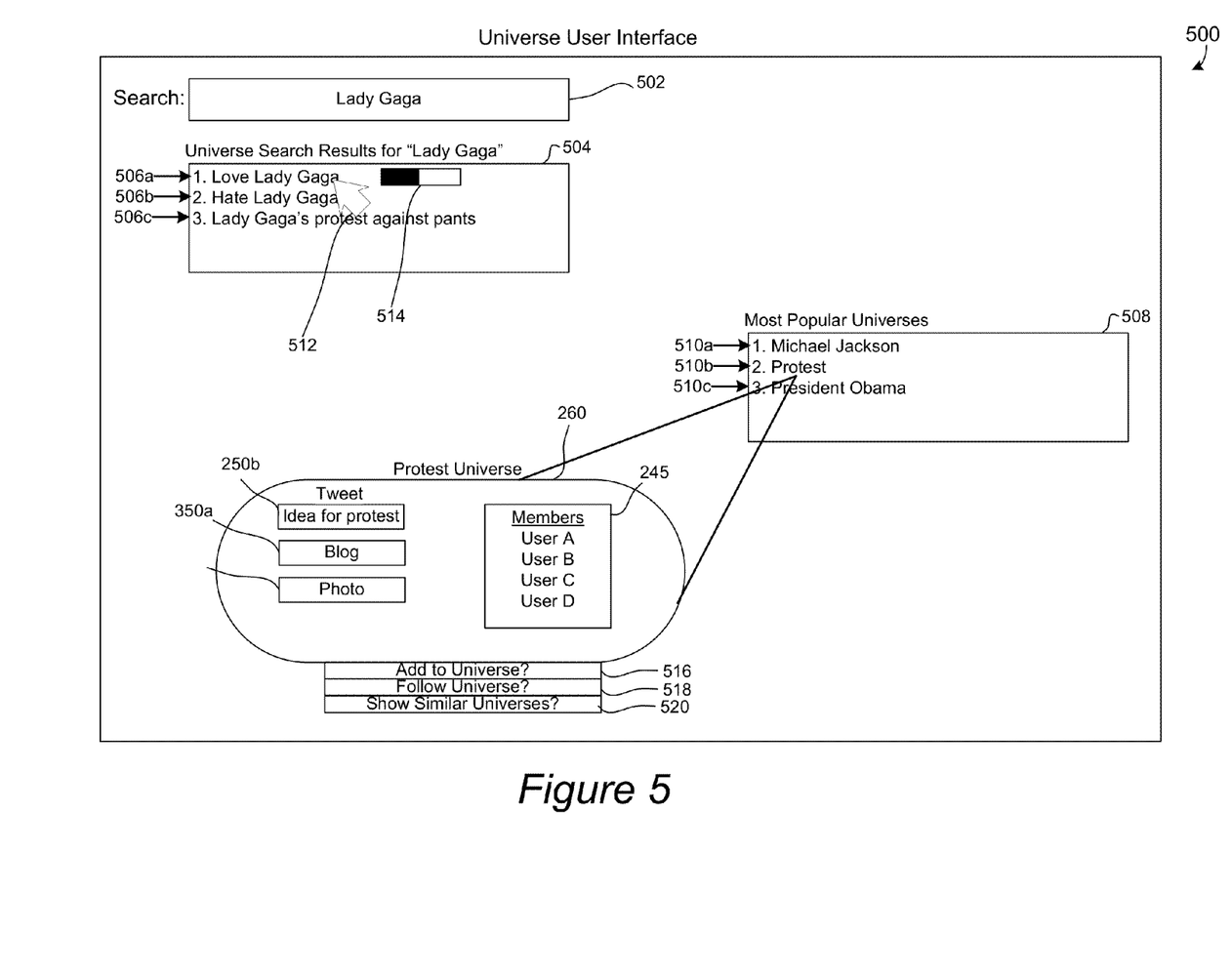
FIG. 5 is a diagrammatic representation of a universe user interface in accordance to one embodiment of the present invention.

A user may be provided with various user interface mechanisms for interacting with universes. FIG. 5 is a diagrammatic representation of a universe user interface 500 in accordance to one embodiment of the present invention. The universe interface 500 may include various ways for a user to select and view particular universes. The universe user interface 500 may include a mechanism for searching through existing universes. In one implementation as shown, the search mechanism is in the form of a search input box 502 into which a user may enter search terms. As shown, a user has entered a search term "Lady Gaga". Universe search results may then be presented in search results window 504. As shown, the search results for Lady Gaga include three existing universes 506a, 506b, and 506c. A user may then select any of these "Lady Gaga" related universes for further viewing. A user may also move their cursor 512 over a particular universe so as to view an icon 514 corresponding to such universe. As shown, the icon 514 indicates a completeness level for the selected universe of about 50%.

The universe user interface 500 may also include a list of the most popular universes in window 508. As shown, three popular universes 510a, 510b, and 510c are shown in the most popular universe window 508. A user may also select any of the most popular universes, e.g., 510a-510c. As exemplified in FIG. 5, a user has selected the protest universe 510b from the most popular universe window 508. As a result of this selection, the protest universe 260 and its content are displayed.

The social media universe system may be configured to perform any suitable analysis with respect to universes and present any portion of the results of such analysis to a user. For example, the most frequently used universes or universes with the most content may be displayed in a list, such as a most popular list, as described above. In another example, statistics regarding a universe's activity may be tracked over time and presented to a user who selects such universe. A universe that is created for a particular celebrity may have its media contribution and membership activities tracked over time. A user may wish to correlate particular events (e.g., press events) for a particular celebrity with such celebrity's universe activity over time.

Once a particular universe is selected, a user may be presented with various interaction options for such selected universe. As shown, the protest universe 260 is associated with an "Add to Universe" feature 516, a "Follow Universe" feature 518, and a "Show Similar Universes" feature 520. Referring back to the process of FIG. 4, it may also be determined whether a "follow universe" request has been received from a user in operation 408. If such a request has been received, the requesting user may be periodically updated with new content or community information for the selected universe in operation 410. For instance, media content and community information may be sent to the subscribing user via any form of communication type, e.g., email, text messaging, etc. Alternatively, the user may simply be presented with updated information from its followed universes when the user visits the social media universe web page and logs into such server. Otherwise, if the user is not making a "Follow Universe" request, this operation may be skipped.

It may also be determined whether an "Add to Universe" request has been received in operation 412. If such request has been received, additional content or users may then be provided by the requester and associated with the selected universe in operation 414. Otherwise, this operation is skipped.

One or more universes may also be recommended to the interacting user based on the user's current universe membership in operation 416. A recommendation may be automatically generated for each user that logs into the social media universe server. For example, if User A belongs to universes A, B, and C, while User B belongs to universes A and B, the system may recommend that User B join universe C. That is, the media social universe system may be configured to find overlapping sets of universes for multiple users and recommend the non-overlapping universes from such overlapping sets to the relevant users. In another example, the system may recommend the most popular universes (e.g., universes that have the most total content or membership or receive media contributions the most frequently) to every user or a select group of users (e.g., users who do not belong to that many users).

Alternatively, a recommendation may be triggered when a user selects an option to see universes that are similar to the currently selected universe, for example, via the "Show Similar Universes" option 520 of FIG. 5. In this example, the user is presented with a list of universe that may have features in common with the currently viewed universe. For instance, universes that are built around concepts that have overlapping terms may be found for a selected universe. In a specific example, universes that are built around concepts pertaining to particular words or phrases which overlap with one or more words of phrases of the selected universe's concept may be located. For example, the universe for the concept "Lady Gaga Haters" may be deemed to be similar to the universe for the concept "Lady Gaga Fashion Haters."

Figure 6:
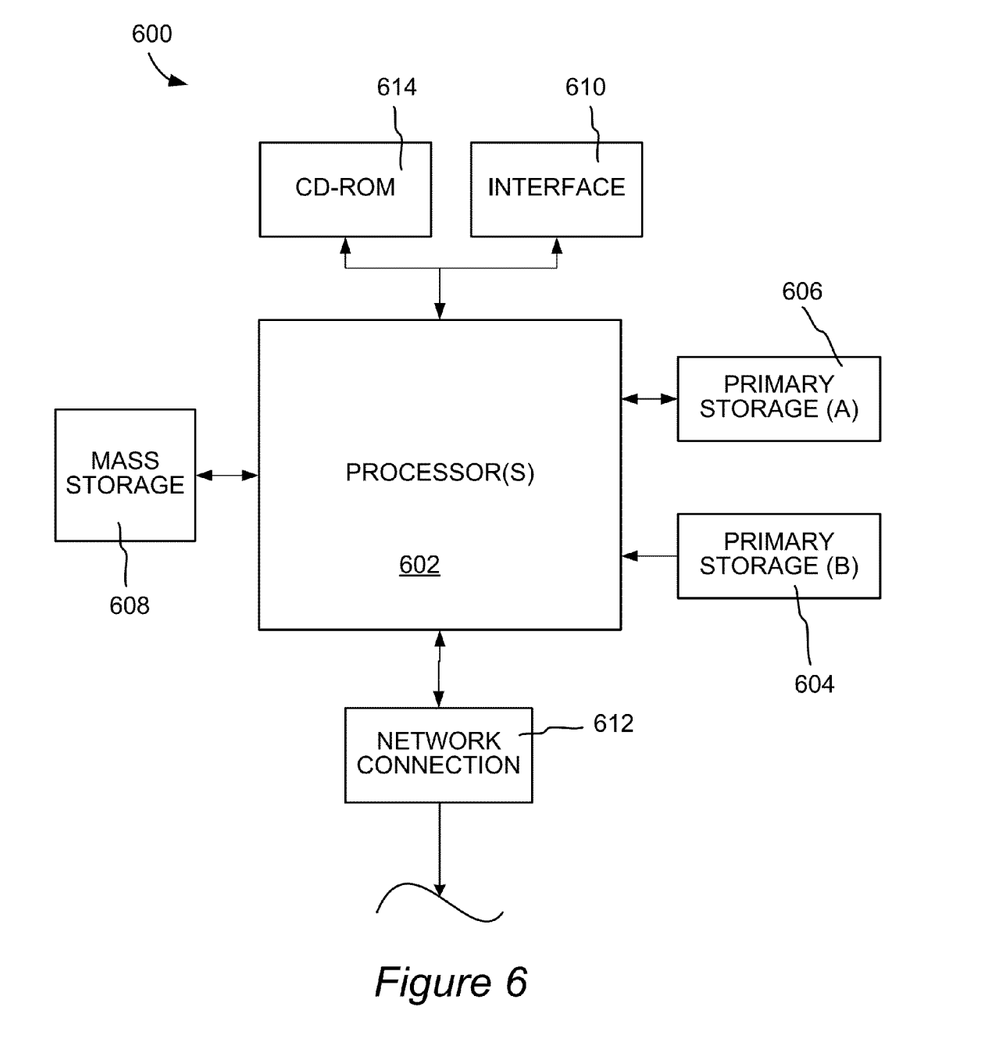
FIG. 6 illustrates an example computer system in which specific embodiments of the present invention may be implemented.

FIG. 6 illustrates a typical computer system that, when appropriately configured or designed, can serve as a social media universe system. The computer system 600 includes any number of processors 602 (also referred to as central processing units, or CPUs) that are coupled to storage devices including primary storage 606 (typically a random access memory, or RAM), primary storage 604 (typically a read only memory, or ROM). CPU 602 may be of various types including microcontrollers and microprocessors such as programmable devices (e.g., CPLDs and FPGAs) and unprogrammable devices such as gate array ASICs or general-purpose microprocessors. As is well known in the art, primary storage 604 acts to transfer data and instructions uni-directionally to the CPU and primary storage 606 is used typically to transfer data and instructions in a bi-directional manner. Both of these primary storage devices may include any suitable computer-readable media such as those described herein. A mass storage device 608 is also coupled bi-directionally to CPU 602 and provides additional data storage capacity and may include any of the computer-readable media described herein. Mass storage device 608 may be used to store programs, data and the like and is typically a secondary storage medium such as a hard disk. It will be appreciated that the information retained within the mass storage device 608, may, in appropriate cases, be incorporated in standard fashion as part of primary storage 606 as virtual memory. A specific mass storage device such as a CD-ROM 614 may also pass data uni-directionally to the CPU.

CPU 602 is also coupled to an interface 610 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 602 optionally may be coupled to an external device such as a database or a computer or telecommunications network using an external connection as shown generally at 612. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store universe concepts, tags, media content, membership lists, a universe index, statistics, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method of managing social media that is shared between a plurality of users, comprising:
    in response to a first user sending media content that is associated with a new concept identified by a first concept tag to one or more other users via one or more social media servers, forming a new universe that represents the new concept and such new universe being associated with the new concept, the first user, and the one or more other users;
    after the new universe representing the new concept is formed and for each subsequent user that sends media content associated with the new concept via the first concept tag to one or more other users, associating such media content, subsequent user, and other users with the new universe; and
    if a requesting user requests to view the new universe, displaying for the requesting user a representation of the media content and any users that are associated with the new universe,
    wherein the representation of the media content and any users associated with the new universe indicates a level of how much media content has been contributed or how many users have contributed media content for such new universe.

2. The method of claim 1, wherein the first concept tag is a hash tag.

3. The method of claim 1, wherein media content sent by the first user or a subsequent user comprises one or more of the following: one or more image objects, one or more video objects, or one or more text objects that pertain to the new concept.

4. The method of claim 1, wherein associating media content and any user that sends or receives such media content with the new universe is accomplished by a web crawling process.

5. The method of claim 4, wherein the web crawling process is performed periodically after the new universe is formed.

6. The method of claim 1, wherein the new concept pertains to one or more of the following: a particular person, a particular thing, a particular event, or a particular place.

7. The method of claim 1, wherein the representation of the media content and any users associated with the new concept allows the requesting user to view all of the media content and users associated with the new universe.

8. An apparatus comprising at least a processor and a memory, wherein the processor and memory are configured to perform the following operations:
   in response to a first user sending media content that is associated with a new concept identified by a first concept tag to one or more other users via one or more social media servers, forming a new universe that represents the new concept and such new universe being associated with the new concept, the first user, and the one or more other users;
   after the new universe representing the new concept is formed and for each subsequent user that sends media content associated with the new concept via the first concept tag to one or more other users, associating such media content, subsequent user, and such other users with the new universe; and
   if a requesting user requests to view the new universe, displaying for the requesting user a representation of the media content and any users that are associated with the new universe,
   wherein the representation of the media content and any users associated with the new universe indicates a level of how much media content has been contributed or how many users have contributed media content for such new universe.

9. The apparatus of claim 8, wherein the first concept tag is a hash tag.

10. The apparatus of claim 8, wherein media content sent by the first user or a subsequent user comprises one or more of the following: one or more image objects, one or more video objects, or one or more text objects that pertain to the new concept.

11. The apparatus of claim 8, wherein associating media content and any user that sends or receives such media content with the new universe is accomplished by a web crawling process.

12. The apparatus of claim 11, wherein the web crawling process is performed periodically after the new universe is formed.

13. The apparatus of claim 8, wherein the new concept pertains to one or more of the following: a particular person, a particular thing, a particular event, or a particular place.

14. The apparatus of claim 8, wherein the representation of the media content and any users associated with the new concept allows the requesting user to view all of the media content and users associated with the new universe.

15. At least one computer readable storage medium, which is non-transitory, tangible, having computer program instructions stored thereon that are arranged to perform the following operations:
   in response to a first user sending media content that is associated with a new concept identified by a first concept tag to one or more other users via one or more social media servers, forming a new universe that represents the new concept and such new universe being associated with the new concept, the first user, and the one or more other users;
   after the new universe representing the new concept is formed and for each subsequent user that sends media content associated with the new concept via the first concept tag to one or more other users, associating such media content, subsequent user, and such other users with the new universe; and
   if a requesting user requests to view the new universe, displaying for the requesting user a representation of the media content and any users that are associated with the new universe,
   wherein the representation of the media content and any users associated with the new universe indicates a level of how much media content has been contributed or how many users have contributed media content for such new universe.

16. The at least one computer readable storage medium of claim 15, wherein the first concept tag is a hash tag.

17. The at least one computer readable storage medium of claim 15, wherein media content sent by the first user or a subsequent user comprises one or more of the following: one or more image objects, one or more video objects, or one or more text objects that pertain to the new concept.

18. The at least one computer readable storage medium of claim 15, wherein associating media content and any user that sends or receives such media content with the new universe is accomplished by a web crawling process.

19. The at least one computer readable storage medium of claim 18, wherein the web crawling process is performed periodically after the new universe is formed.

20. The at least one computer readable storage medium of claim 15, wherein the new concept pertains to one or more of the following: a particular person, a particular thing, a particular event, or a particular place.

21. The at least one computer readable storage medium of claim 15, wherein the representation of the media content and any users associated with the new concept allows the requesting user to view all of the media content and users associated with the new universe.

* * * * *